July 25, 1950

F. F. SLACK 2,516,533

ELECTRICAL CIRCUIT

Filed April 7, 1945

*INVENTOR.*
FREDERICK F. SLACK

BY

*William D. Hall*

ATTORNEY

Patented July 25, 1950

2,516,533

UNITED STATES PATENT OFFICE 2,516,533

ELECTRICAL CIRCUIT

Frederick F. Slack, Medford, Mass., assignor, by mesne assignments, to the United States of America as represented by the Secretary of War Application April 7, 1945, Serial No. 587,191

2 Claims. (Cl. 250—27)

The present invention relates to electronic scaling circuits or frequency dividing circuits.

It is an object of the invention to provide a scaling circuit adapted to produce in the output thereof voltage pulses whose repetition rate is a known submultiple of the repetition rate of voltage pulses impressed on the input of the circuit.

Another object of the invention is to provide a scaling circuit of the above type which is of simple design and stable in operation.

For a better understanding of the invention as well as other objects and features thereof, reference is had to the following detailed description to be read in connection with the attached drawing wherein like components are designated by like numerals. The scope of the invention will be pointed out in the accompanying claims.

Figure 1:
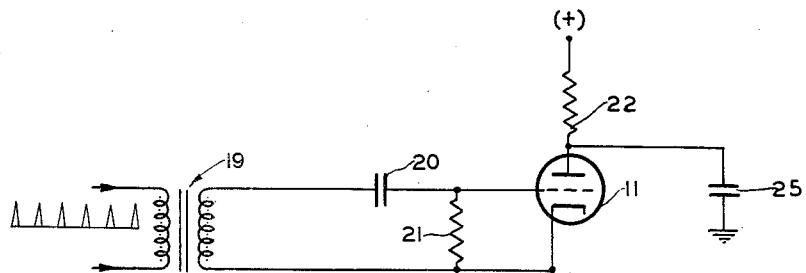
Figure 1 is a schematic diagram of a preferred embodiment of a scaling circuit in accordance with the invention.

Referring now to the drawing and more particularly to Figure 1 a scaling circuit is shown consisting of a blocking oscillator, including a triode 10, and an electronic switch, including a triode 11.

The blocking oscillator is of conventional design and comprises a transformer 12, having its primary winding 13 connected on one side to the cathode of triode 10 and on the other side to the grid thereof through a blocking capacitor 14. The secondary winding 15 of the transformer is connected on one side to the plate of triode 10 and on the other to a source of positive potential. The oscillator circuit is completed by a grid resistor 16 of very high value, connected between the grid and cathode of triode 10.

Considering the free-running behavior of the blocking oscillator apart from the effect thereon caused by incoming pulses fed to the electronic switch, associated therewith, the action is as follows: The capacitor 14, charged negatively with respect to the grid of triode 10 due to a preceding cycle of operation, discharges through resistor 16. The grid voltage on triode 10 is beyond cut-off, but as capacitor 14 discharges the point is reached at which plate current commences to flow. The plate current flow through secondary winding 15 induces a voltage in the primary 13 which drives the grid less negative. Thus, a cumulative action occurs which very rapidly drives the grid positive at which point grid current begins to flow.

The grid current charges capacitor 14. Due to the oscillatory action of the circuit, the plate potential then begins to rise to complete the first cycle or pulse of the oscillation. In the meantime, the charge accumulated on capacitor 14 depresses the grid potential so that the succeeding oscillations are cut off and do not appear. The grid remains negative due to the charge trapped on capacitor 14. This is the condition assumed initially above. Therefore capacitor 14 is discharged through resistor 16 and the operation is repeated after a time dependent on the time-constant of the R-C combination formed by capacitor 14 and resistor 16. The pulses are drawn from the blocking oscillator by means of a tertiary winding 17 coupled to the secondary winding 15.

The rate at which the leading edge of the pulse rises is determined by the feedback through transformer 12. This rate is closely associated with the frequency of oscillation which the circuit would exhibit if blocking capacitor 14 were omitted, which frequency is largely determined by the inductance and distributed capacitance of the transformer windings 13 and 15.

Since a single sharply defined pulse is required, the oscillation must build up during the first half cycle of the oscillation due to feedback. For this reason, transformer winding 13 and 15 must be tightly coupled. The transformer 12 must display high losses to permit immediate cessation of oscillation when the grid of triode 10 goes beyond the cut-off point.

Figure 2:
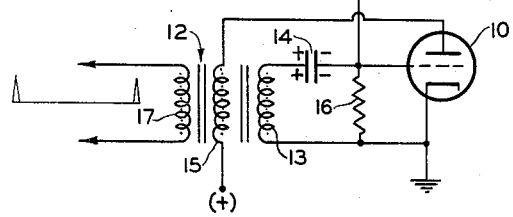
Figure 2 is the wave form of grid voltage on triode 10 in Figure 1 prior to the introduction of triggering pulses.

The voltage curve on the grid of triode 10 when the oscillator is in a free-running condition is illustrated in Figure 2. It will be seen that a single oscillatory cycle 18 is developed, and then suppressed by the charge on capacitor 14 which is then discharged by resistor 16 until the point above cut-off is reached, whereupon another pulse is developed and the process repeated.

The operation of the blocking oscillator follows the above described course whether it is in free-running condition or triggered by conventional methods, i. e., injecting block-in pulses directly on the grid of the oscillator tube; in both cases, during that time when the oscillator is blocked, the capacitor 14 is discharging through resistor 16. In the present invention, however, the discharge of capacitor 14 is not allowed to take place in the usual manner. Referring again to Figure 1, the incoming pulses to be scaled are applied to the primary of a transformer 19, the secondary thereof being connected on one side to the cathode of triode 11 and on the other to the grid through a capacitor 20. A grid leak 21 is connected between grid and cathode of triode 11. A resistor 22 is connected between the plate of triode 11 and a source of positive potential, the ohmic value of resistor 22 being considerably less than resistor 16. The cathode of triode 11 is connected to the grid of triode 10.

Figure 3:
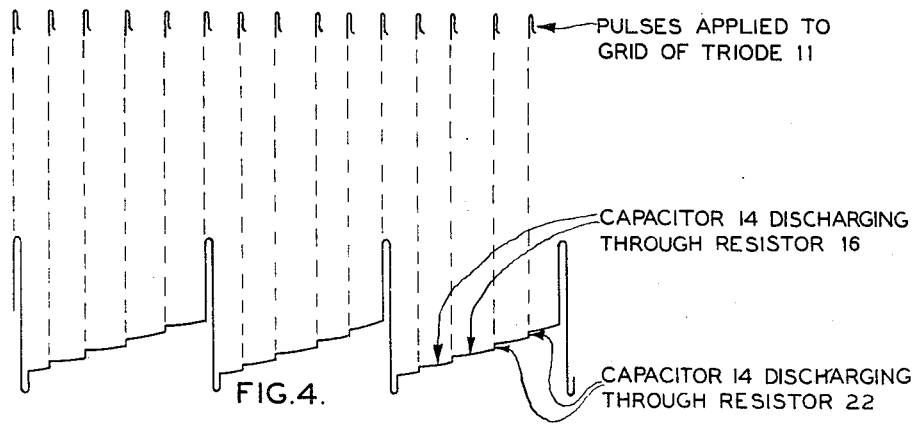
Figure 3 is a schematic circuit equivalent to a parameter in the arrangement of Figure 1.

The incoming pulses are applied with a polarity and magnitude whereby triode 11 is rendered conductive at the appearance of each pulse and the cathode is clamped to the plate potential. The values of capacitor 20 and resistor 21 are such that triode 11 is conductive only for the duration of the incoming pulse. The conduction of triode 11 is comparable to the closing of a switch. Since resistor 22 has a far smaller value than resistor 16, when triode 11 conducts at the entrance of a pulse, the capacitor 14 has a lower resistance path through which to discharge. Moreover, the discharge is hastened since the polarity of the voltage source on triode 11 is such as to aid the discharge process. This is demonstrated by Figure 3 showing an equivalent circuit wherein switch 23 represents triode 11 and battery 24, the voltage source for the plate of triode 11.

Figure 4:
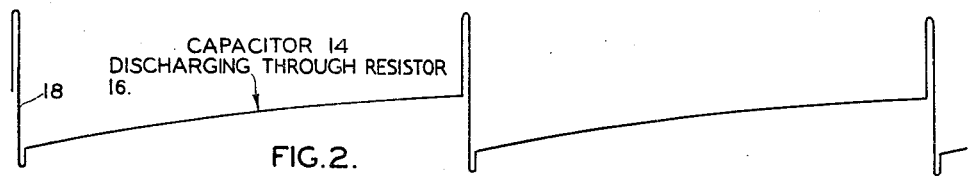
Figure 4 is the wave form of grid voltage on triode 10 in Figure 1 resulting from the application of triggering pulses.

As the electronic switch is actuated by the incoming pulses the grid potential curve on triode 10 will ascend in a stepwise manner as illustrated in Figure 4. The relatively flat portion of its rise represents intervals when capacitor 14 is discharged solely through resistor 16 since triode 11 is non-conductive. The short steep portion of the grid potential rise occurs when triode 11 conducts briefly under the influence of an incoming pulse and capacitor 14 also discharges through resistor 22. The stepwise rise in grid voltage continues until the grid potential is just below cut-off. When the next incoming pulse arrives, the blocking oscillator operates generating an output pulse. The process is then repeated, and, in consequence, the output pulse frequency will be a simple-submultiple of the input pulse frequency.

A condenser 25, connected between the plate of triode 11 and ground, has the effect of maintaining the potential at the plate relatively constant and has been found to improve the stability of operation.

This circuit can be made to have a constant value of frequency division over a wide range of input pulse-repetition frequencies. This is done by making the size of resistor 16 very large. The portion of the discharge curve of capacitor 14 discharging through resistor 16 will then be substantially horizontal, on the curve of Fig. 2. Resistor 16 was made to be ten megohms in one application. Under some conditions, it may be desirable to take out resistor 16 completely.

While scaling circuits heretofore known have entailed blocking oscillators as components, attempts are usually made to have the output frequency lock in with a submultiple of the input frequency by injecting a trigger pulse directly on the grid of the blocking oscillator. The present invention as described herein, operates on a different principle, since the trigger pulses are applied to a switch tube and are used to lift the grid potential in a stepwise manner until conduction is effected. This circuit has proved to be dependable in operation and of superior stability.

While there has been shown and described what is at present considered a preferred embodiment of the invention, it is obvious that many changes and modifications may be made therein without departing from the scope of the invention, and it is aimed, therefore, to cover all such changes and modifications in the accompanying claims.

What is claimed is:

1. In a scaling circuit, comprising a first thermionic tube having at least cathode, grid and plate electrodes, a transformer coupling the plate circuit to the grid circuit of said first thermionic tube in a regenerative manner, a blocking capacitor in the grid circuit of said first thermionic tube, a first resistor of high value connected between grid and cathode of said first thermionic tube, whereby said tube generates periodic pulses, a second thermionic tube having at least cathode, grid and plate electrodes, said latter cathode being connected to the grid of said first thermionic tube, a source of positive potential, a second resistor connected between said source of positive potential and the plate of said second thermionic tube, and means for applying input pulses at a first frequency to the grid of said second thermionic tube in a manner whereby said device is periodically rendered conductive to provide a discharge path for said capacitor whereby it discharges in a stepwise manner and periodically causes said first thermionic tube to become conductive at a second frequency which is a submultiple of the first frequency, the size of said first resistor being such that said submultiple is substantially constant over a range of first frequencies.

2. In a scaling circuit, the combination comprising a blocking oscillator for generating output pulses including a first thermionic tube having a blocking capacitor in the control circuit thereof, a discharge resistor of high value in association with said blocking capacitor, a second thermionic tube including at least cathode and plate electrodes, said cathode being connected to one terminal of said blocking capacitor, a source of positive potential, a second resistor connected between said plate and said source of positive potential, and means responsive to input pulses at a first frequency for rendering said second discharge device conductive to provide a discharge path for said capacitor whereby it discharges in a stepwise manner and periodically causes said first thermionic tube to become conductive at a second frequency which is a submultiple of the first frequency, the size of said first resistor being such that said submultiple is substantially constant over a range of first frequencies.

FREDERICK F. SLACK.

REFERENCES CITED

The following references are of record in the file of this patent:

UNITED STATES PATENTS

| Number | Name | Date |
|---|---|---|
| 1,896,417 | Page | Feb. 7, 1933 |
| 2,237,668 | Hermann | Apr. 8, 1941 |
| 2,277,000 | Bingley | Mar. 17, 1942 |